United States Patent [19]  [11] 4,209,390
Cabane et al.  [45] Jun. 24, 1980

[54] PROCESS FOR BIOLOGICAL DENITRIFICATION OF EFFLUENTS

[75] Inventors: Bruno Cabane, St. Cloud; Joel Vergnault, Argenteuil, both of France

[73] Assignee: Produits Chimiques Ugine Kuhlmann, Paris, France

[21] Appl. No.: 922,343

[22] Filed: Jul. 6, 1978

[30] Foreign Application Priority Data

Aug. 7, 1977 [FR] France .............................. 77 21119

[51] Int. Cl.$^2$ .............................................. C02C 1/14
[52] U.S. Cl. ...................................... 210/12; 210/17; 210/DIG. 28; 435/176; 435/245; 435/262; 435/813
[58] Field of Search .................. 210/2, 11, 12, 16, 17, 210/150, 151; 195/DIG. 28, 116, 3 R, 3 H, 2

[56] References Cited

U.S. PATENT DOCUMENTS

| 1,744,001 | 12/1927 | Owen | 195/116 |
|---|---|---|---|
| 3,617,540 | 11/1971 | Bishop | 210/16 |
| 3,709,364 | 1/1973 | Savage | 210/11 |
| 3,728,279 | 4/1973 | Salomone | 210/11 |
| 3,749,245 | 7/1973 | Kerecz | 210/12 |
| 3,829,377 | 8/1974 | Hashimotu | 210/11 |
| 3,846,289 | 11/1974 | Jeris | 210/DIG. 28 |
| 3,957,632 | 5/1976 | Knupp | 210/16 |
| 4,032,407 | 6/1977 | Scott | 195/116 |
| 4,043,936 | 8/1977 | Francis | 210/11 |
| 4,104,167 | 8/1978 | Besik | 210/197 |

FOREIGN PATENT DOCUMENTS

| 5148560 | 10/1974 | Japan | 210/DIG. 28 |
|---|---|---|---|
| 49-135448 | 12/1974 | Japan | 210/16 |
| 50-152552 | 8/1975 | Japan | 210/DIG. 28 |

OTHER PUBLICATIONS

Microbiology, Reid, McGraw-Hill, New York, 1972, 142–143.
Jeris, "Pilot-Scale, High Rate Biological Denitrification," JWPCF vol. 47, No. 8, pp. 2043–2059, Aug. 1975.
St. Amant, "Treatment of High Nitrate Waters," Jour. AWWA, pp. 659–662, May 21, 1969.

*Primary Examiner*—Ernest G. Therkorn
*Attorney, Agent, or Firm*—Pennie & Edmonds

[57] ABSTRACT

The present invention is directed to a process for biological denitrification of effluents, containing up to 10 g/l of nitric nitrogen, which comprises using an active denitrification support made of selected high performance denitrifying bacteria fixed on a neutral support.

8 Claims, No Drawings

PROCESS FOR BIOLOGICAL DENITRIFICATION OF EFFLUENTS

FIELD OF THE INVENTION

This invention relates to a high performance biological dentrification process used in homogeneous, fixed bed, or fluid bed reactors.

BACKGROUND OF THE INVENTION

Prior art processes teach elimination of nitrates, but such elimination is relatively slow and there are few processes that can be utilized for industrial waste waters. These prior art processes are used mainly for denitrification of urban effluents having minimal nitrate concentration about 100 mg/l. Higher concentrations, above 3.5 g/l nitric nitrogen, have slow denitrification rates on the order of 1 to 1.5 mg nitrogen per liter per hour.

Moreover, such denitrification is performed with an uncontrolled complex flora, and consequently, denitrification capacities of a reactor are difficult to predict.

DETAILED DESCRIPTION OF THE PREFERRED EMBODIMENTS

The present invention is directed to industrial waste waters and processes making it possible to reduce, at a high transformation rate, the concentration of nitric nitrogen, while minimizing the concentrations of carbon substrate necessary for denitrification. In particular, the performances obtained in this process with the use of a fluid bed reaction are superior to all those known for the same type of reactor, as described in J. Jeris et al., 46 Journal W.P.C.F. No. 9 at 2043–2057 (1974), B. Ericsson, 47 Journal W.P.C.F. No. 4 at 727–740 (1975), C. Francis et al., 11 Water Res. at 289–294 (1977), F. Clark et al., 7 INIS Atom index 8, Abstract No. 2379 73 (1976), and D. Dodd et al., 9 Water Res. at 323–328 (1975). Addition of trace elements increases denitrification rates.

The present process comprises making an active denitrification support formed of selected denitrifying bacteria and very fine calcium carbonate which surrounds a particle or support constituting the nucleus of a grain, for example, charcoal or $CaCO_3$ nucleus. The process is characterized by affixing a denitrifying flora, suited to a given exogenous substrate, on a solid support. Active denitrification supports obtained by the present process can be used in any type of denitrification reactor, such as homogeneous, fixed bed or fluid bed reactors.

Strains of bacteria exhibiting a denitrifying activity are selected as a function of the organic carbon substrate used in the denitrification, for example, alcohols, urban effluent, factory effluent, as a function of the type of nitrates and as a function of the concentration of the nitrates. The strains are enriched by successive subcultures in a liquid medium to realize the best possible anaerobiosis. Addition of yeast extract at a rate of 1 g/l to such media is contemplated. The type of media employed are described below:

For 1 liter distilled water:
standard saline solution: 50 ml
potassium nitrate: 5 g
calcium carbonate: 5 g
solution of Kaiser trace elements: 1 ml
carbon substrate (methanol, ethanol): 1 g
The resulting enriched denitrifying strains are then isolated; the isolation being performed on a solid medium in an anaerobiosis test jar. Growth of colonies requires 8 days at 30° C. Selected strains are put in preculture in an anaerobiosis reactor with a substrate of nitrate and carbon to permit an induction of denitrifying activities and a production of biomasses having this activity.

The biomass is then separated by centrifuging or decanting before being resown in the effluents to be denitrified. Before resowing, the effluent is possibly degassed by suitable methods such as bubbling of nitrogen, heating, addition of sulfites. The effluents thus sown can continuously supply either an agitated homogeneous reactor or a homogeneous reactor filled with a support for fixation of the microorganisms. This support is made in a fermenter from a central nucleus formed by charcoal surrounded by very fine calcium carbonate or any other suitable neutral support, for example, $CaCO_3$ grains, on which the denitrifying bacteria are fixed by adsorption. A column reactor equipped with a fixed bed or a fluidized bed column reactor operated continuously or batch-wise can also be supplied. Knowing the kinetic characteristics of the strain, KS substrate, denitrification rate, etc., denitrification capacity of a reactor can be predicted.

The process is started by completely recycling the effluent charged with microorganisms. This recycling is necessary to permit induction of the denitrifying activity and to permit maximum fixation of the microorganisms on the support. $CaCO_3$ and denitrifying bacteria are formed during reaction. This reaction is a denitrification reaction of $Ca(NO_3)_2$; consequently, it can be performed at the beginning of the denitrification operation with the equipment provided for final treatment. The active denitrification support thus formed has been found to perform very effectively in the various reactors noted above and particularly in fluidized bed reactors.

Continuous operation is reached when the denitrifying activity is considered sufficient, that is when, after having progressively increased the rate of dilution, a residual nitrate concentration, that does not exceed a desired rate is obtained in the effluent.

Denitrification can occur at temperatures that vary from 5° to 40° C. but is preferable at about 30° C. Denitrification preferably takes place at a basic pH facilitating carbonation. The calcium carbonate, progressively surrounding the charcoal particle, is a denitrification by-product and a pH buffer.

EXAMPLES

The following examples illustrate the invention without, however, limiting it:

EXAMPLES I TO V

The following denitrification medium is used:
Nitric nitrogen: $KNO_3$
Carbon substrate: glucose
Support and preculture: a preculture is done in anaerobiosis on glucose with $Ca(NO_3)_2+CaCO_3$ from a strain of the Pseudomonas genus, which is denitrifying. This preculture makes it possible to obtain denitrifying muds necessary for making the activated denitrification support.

A homogeneous reactor, having a useful volume of 18 liters, was sown with denitrifying bacteria. The above denitrification medium was placed in the reactor. Powdered charcoal was added to the denitrification medium and acted as a primary support for fixation of the calcium carbonate grains and of the denitrifying bacteria that are developed in the denitrification medium. Regarding denitrification, the resulting muds were very active. This material can be used with any type of reactor and with any substrate source. The following results were obtained:

| Example Number | Influent nitric nitrogen: (mg/l) | Dwella Time (hours) | % Nitrogen purification |
|---|---|---|---|
| I | 700 | 60 | 99.9 |
| II | 1400 | 60 | 99.3 |
| III | 2100 | 60 | 98 |
| IV | 2800 | 120 | 99.3 |
| V | 8400 | 130 | 90 |

EXAMPLE VI

A $CaCO_3$ support with its denitrifying biomass was made as in EXAMPLE I except that denitrifying strain of Pseudomonas genus was sown in a medium containing $Ca(NO_3)_2$, fine charcoal and methanol. The culture is maintained in anaerobiosis. A solution of trace elements (1 ml/l) was added to the denitrification medium. The trace element solution comprised per liter of distilled water.
$MgSO_4$:125 mg
$K_2HPO_4$:60 mg
$CuSO_4$, 5 $H_2O$: 0.6 mg
$FeCl_3$, 6 $H_2O$: 2.4 mg
KI: 0.8 mg
$MnSO_4$, $H_2O$: 3 mg
$Na_2MoO_4$, 2 $H_2O$: 2 mg
$ZnSO_4$, 7 $H_2O$: 2 mg
$H_3BO_3$: 0.2 mg
$Co(NO_3)_2$, 6 $H_2O$: 0.05 mg
$CdSO_4$, 3 $H_2O$: 0.05 mg
$H_3PO_4$ at 95%: 20 mg
Fluidized bed
column reactor: 1.25 useful liters
Carbon substrate: Methanol
The following results were obtained:
Nitric nitrogen: $Ca(NO_3)_2$ (600 mg/l of nitric nitrogen)
Dwell time: 0.70 h
Purification rate: 99.5%
N eliminated: 20.5 kg/d/$m^3$ of reactor

EXAMPLE VII

The operating conditions were the same as in EXAMPLE VI except that dwell time was increased with the following results:
Dwell time: 1.15 h
Purification rate: 99.9%
N eliminated: 12.3 kg/d/$m^3$ of reactor

EXAMPLE VIII

The operating conditions were the same as in EXAMPLE VI except:
Reactor: fluid bed column useful volume: 1.25 l
Nitric nitrogen: $Ca(NO_3)_2$ (650 mg/l of nitric nitrogen)
Carbon substrate: acrylic acid
Support and preculture: the preparation was performed as in EXAMPLE VI, the methanol being replaced by acrylic acid. The following results were obtained:
Dwell time: 1.8 h
Nitrogen purification rate: 97.5%
N eliminated: 8.4 kg/d/$m^3$ It is not intended to limit the present invention to the specific embodiments described above. Other changes may be made in the process specifically described herein without departing from the scope and teachings of the instant invention, and it is intended to encompass all other embodiments, alternatives and modifications consistant with the present invention.

What is claimed is:

1. A process for the biological denitrification of effluents containing up to 10 g/l of nitric nitrogen comprising:
    (a) selecting strains of bacteria having a denitrifying activity;
    (b) preculturing the selected strains in a denitrification medium containing a substrate of calcium nitrate under anaerobiosis conditions in the presence of a carbonaceous material to form in situ an active denitrification support comprising denitrifying bacteria and grains of calcium carbonate; and
    (c) contacting the active denitrification support with the effluents containing nitric nitrogen which are to be denitrified.

2. The process of claim 1 wherein the strains of bacteria having a denitrifying activity are selected by successive subcultures in a liquid medium comprising components selected as a function of the organic carbon substrate used in the denitrification and as a function of the type and concentration of nitric nitrogen in the effluents.

3. The process of claim 2 wherein yeast extract is added to the liquid medium in which the selected strains of bacteria having denitrifying activity are enriched by successive subcultures.

4. The process of claim 1 wherein the active denitrification support comprises a central nucleus on which are fixed the denitrifying bacteria and the calcium carbonate formed by the denitrification reaction.

5. The process of claim 4 wherein the central nucleus is selected from the group comprising charcoal and calcium carbonate grains.

6. The process of claim 1 wherein the rate of denitrification is increased by the addition of a solution of trace elements to the denitrification medium.

7. The process of claim 1 wherein the denitrification occurs at 30° C.

8. The process of claim 1 wherein the effluent to be denitrified is an industrial effluent.

* * * * *

UNITED STATES PATENT AND TRADEMARK OFFICE
CERTIFICATE OF CORRECTION

PATENT NO. : 4,209,390
DATED : June 24, 1980
INVENTOR(S) : Bruno Cabane et al.

It is certified that error appears in the above—identified patent and that said Letters Patent is hereby corrected as shown below:

On the title page, Item [30], "Aug. 7, 1977" should read -- July 8, 1977 --.

Signed and Sealed this

Sixteenth Day of June 1981

[SEAL]

Attest:

RENE D. TEGTMEYER

Attesting Officer

Acting Commissioner of Patents and Trademarks